(12) United States Patent
Friederich

(10) Patent No.: US 6,374,863 B1
(45) Date of Patent: Apr. 23, 2002

(54) DOUBLE WALLED TUBE WITH LEAK DISPLAY DEVICE

(75) Inventor: Hans-Werner Friederich, Winsen (DE)

(73) Assignee: Phoenix AG, Hamburg (DE)

(*) Notice: Subject to any disclaimer, the term of this patent is extended or adjusted under 35 U.S.C. 154(b) by 0 days.

(21) Appl. No.: 09/889,757
(22) PCT Filed: Oct. 24, 2000
(86) PCT No.: PCT/DE00/03738
§ 371 Date: Jul. 20, 2001
§ 102(e) Date: Jul. 20, 2001
(87) PCT Pub. No.: WO01/38769
PCT Pub. Date: May 31, 2001

(30) Foreign Application Priority Data

Nov. 23, 1999 (DE) .......................... 199 56 198

(51) Int. Cl.⁷ .............................. F16L 33/01; G01M 3/18
(52) U.S. Cl. ...................... 138/104; 138/140; 73/40; 340/605
(58) Field of Search ................. 138/104, 140, 138/148; 340/605; 73/40, 40.5 R

(56) References Cited

U.S. PATENT DOCUMENTS

| | | | |
|---|---|---|---|
| 4,465,105 A | * 8/1984 | Slater | 138/104 |
| 4,775,855 A | * 10/1988 | Cox | 138/104 X |
| 5,343,738 A | 9/1994 | Skaggs | 73/40.5 R |
| 5,654,499 A | * 8/1997 | Manuli | 138/104 X |

FOREIGN PATENT DOCUMENTS

| | | |
|---|---|---|
| DE | 44 02 255 | 7/1994 |
| DE | 198 21 637 | 11/1999 |
| EP | 0 535 997 | 4/1993 |
| EP | 0 695 902 | 2/1996 |
| GB | 2 027 838 | 2/1980 |
| JP | 08261861 | 10/1996 |
| JP | 10148280 | 6/1998 |

\* cited by examiner

Primary Examiner—Patrick Brinson
(74) Attorney, Agent, or Firm—Collard & Roe, P.C.

(57) ABSTRACT

The invention relates to a tube arrangement, comprising at least the following components: a flexible double casing tube, with an inner tube (1) and an outer tube (2), forming a ring gap (3) which opens out into a widened cavity (43), in the vicinity of their ends; a connector (4), arranged at each end of the double casing tube, comprising a flange (42) and a fitting which, in the vicinity of the end of the outer tube (2) and of the cavity (43), has a first annular ring (6) and in the vicinity of the end of the inner tube (1), a second annular ring (5), a dividing chamber (10), between the flange (42) and the first annular ring (6) which is surrounded by a chamber enclosure (11), the chamber (10), furthermore, is connected to the cavity (43) and a drilling (12) exists in the chamber enclosure (11); a signal transmitter, which is arranged at each end of the tube, in the vicinity of the fitting, each one being connected to the drilling in the chamber enclosure by means of a connecter opening. According to the invention, the first signal transmitter is an inflatable container and the second signal transmitter is a lamp with light sticks. Possible embodiments of the tube arrangement, which are of advantage, are disclosed.

12 Claims, 5 Drawing Sheets

DOUBLE WALLED TUBE WITH LEAK DISPLAY DEVICE

CROSS REFERENCE TO RELATED APPLICATIONS

Applicants claim priority under 35 U.S.C. §119 of GERMAN_Application No. 199 56 198.2, filed on Nov. 23 1999. Applicants also claim priority under 35 U.S.C. §120 of PCT/DE00/03738, filed on Oct. 24, 2000. The international application under PCT article 21(2) was not published in English.

The invention relates to a tube arrangement comprised of at least the following components:

A flexible double-casing tube comprised of an inner tube and an outer tube, forming a ring gap that opens out into a widened intermediate cavity in the vicinity of the ends of the tubes;

a connector that is arranged on each end of the double-casing tube, whereby the connector comprises a flange and a fitting; whereby the fitting in turn comprises in the vicinity of the end zone of the outer tube and the intermediate cavity a first annular bead, as well as mostly within the end zone of the inner tube a second annular bead and, furthermore, is provided with a gap-shaped chamber that is located between the flange and the first annular bead and surrounded by a chamber enclosure; and whereby, furthermore, the chamber is connected with the intermediate cavity, and a drilled hole is provided in the enclosure of the chamber; as well as a signal transmitter located at each end of the tube in the vicinity of the fitting, whereby each signal transmitter is connected to the drilled hole in the enclosure of the chamber by means of a connector opening.

A tube arrangement of the type specified that comprises a signaling or alarm system that can be activated, is known, for example from published patent documents DE 44 02 255 A1 and EP 0 695 902 B1. The mode of operation is described in said documents only briefly.

In case of any failure of the inner tube, the outer tube absorbs the pressure, so that no medium can leak to the outside. As the outer tube has a higher radial expansion under pressure than the inner tube, a gap is formed between the two tubes when the inner tube fails. The medium penetrates such a gap up into the zone of the fitting. The area of the fitting is realized in such a way that the medium is guided in a controlled manner through channels leading to an opening. Signal transmitters are installed on said opening.

The signal transmitters are mounted on both ends of the tube in the vicinity of the fitting and report any failure of the inner tube. Said signal transmitters may be of the electrical or mechanical type. The electrical signal transmitters have the drawback that the contacts have to be protected against corrosion. This is expensive and requires much expenditure. Furthermore, a central receiving station has to be available and occupied. This requires high expenditure particularly in the area where different operators work in shifts.

Now, excluding the drawbacks specified above, the tube system as defined in the characterizing part of claim 1 is characterized in that the first signal transmitter is an inflatable container, and the second signal transmitter is a lamp with light sticks.

Useful variations of the tube system as defined by the invention are specified in claims 2 to 12.

Now, the invention is explained in the following with the help of exemplified embodiments and by reference to schematic drawings, in which.

Figure 1:
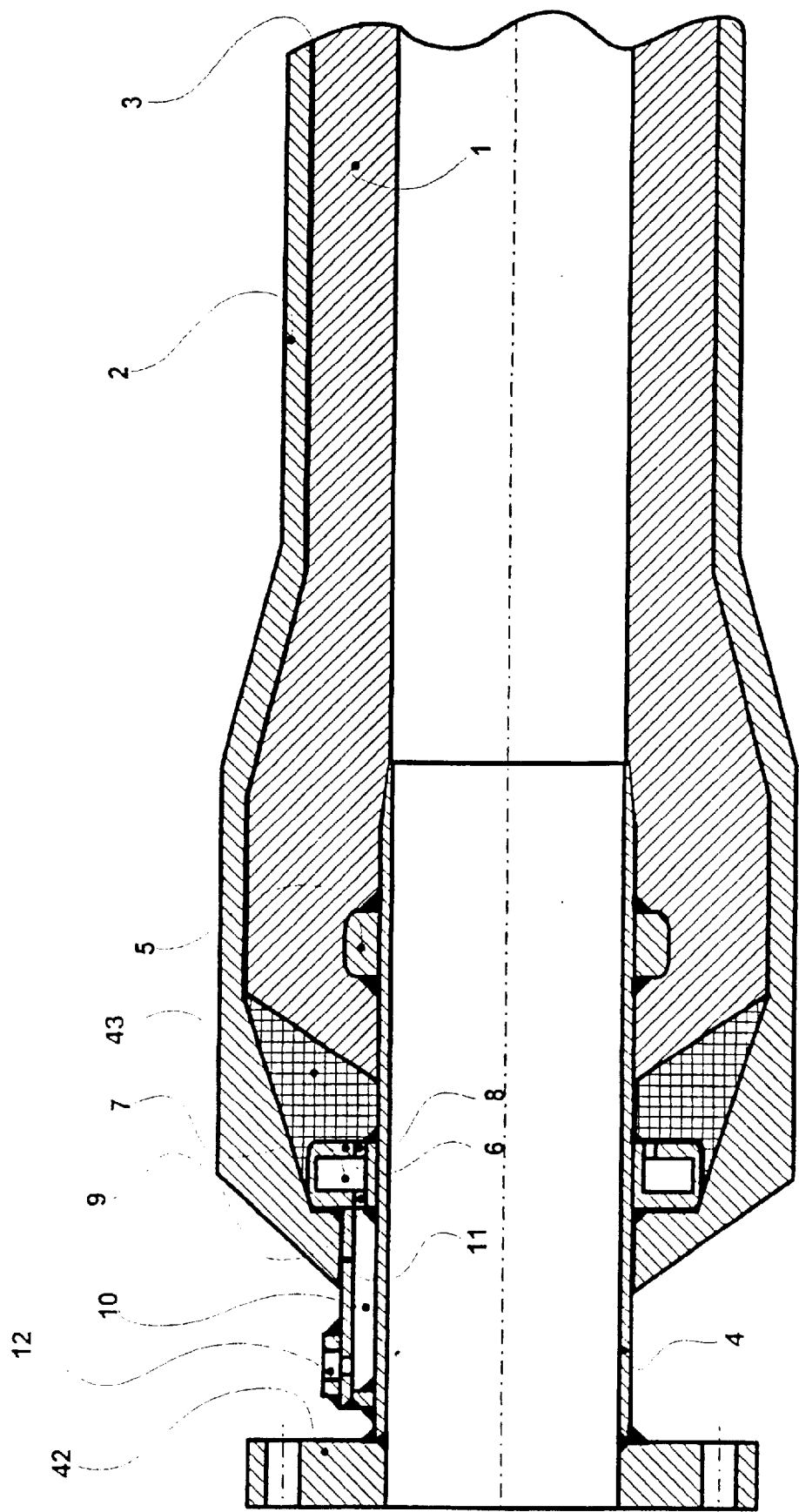
FIG. 1 shows an axial section through a tube arrangement comprised of a double wall tube and a connector.
Figure 7:
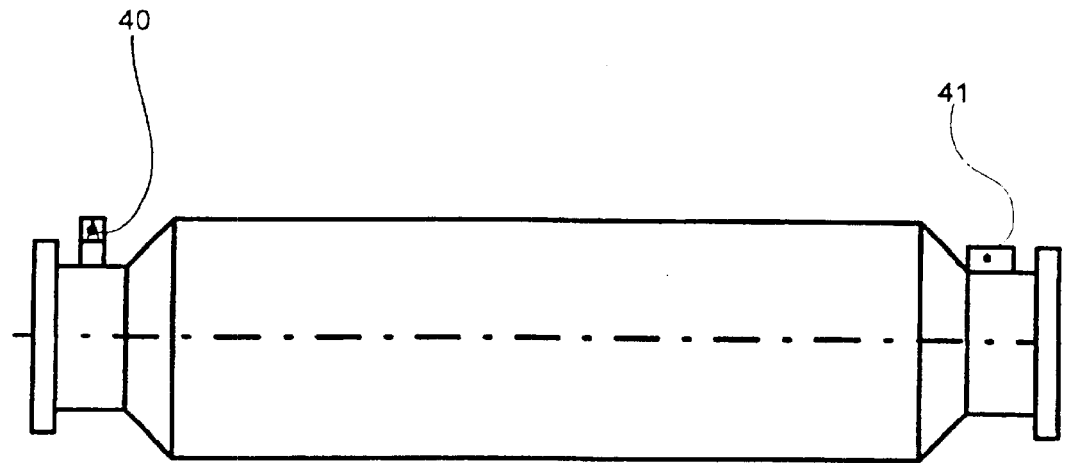
FIG. 7 shows a tube arrangement with the two signal transmitters (in the deactivated state).
Figure 8:
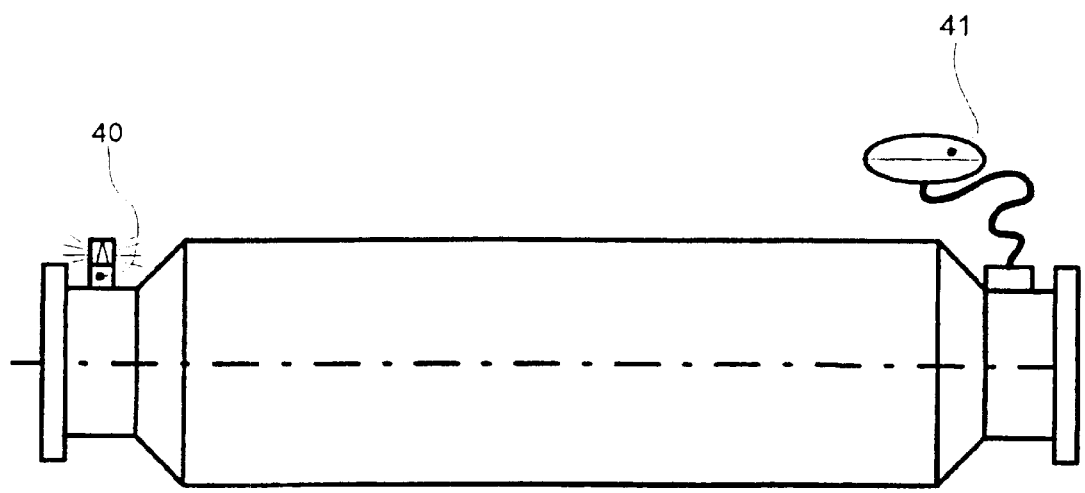
FIG. 8 shows a tube arrangement with the two signal transmitters (in the activated state).

According to FIG. 1, the inner tube 1 is completely covered by the outer tube 2. An annular gap 3 exists or is formed between the two tubes 1 and 2. The tube ends are fitted with a connector 4. The signal transmitters 40 and 41 are mounted on the tube ends (FIGS. 7 and 8).

Figure 2:
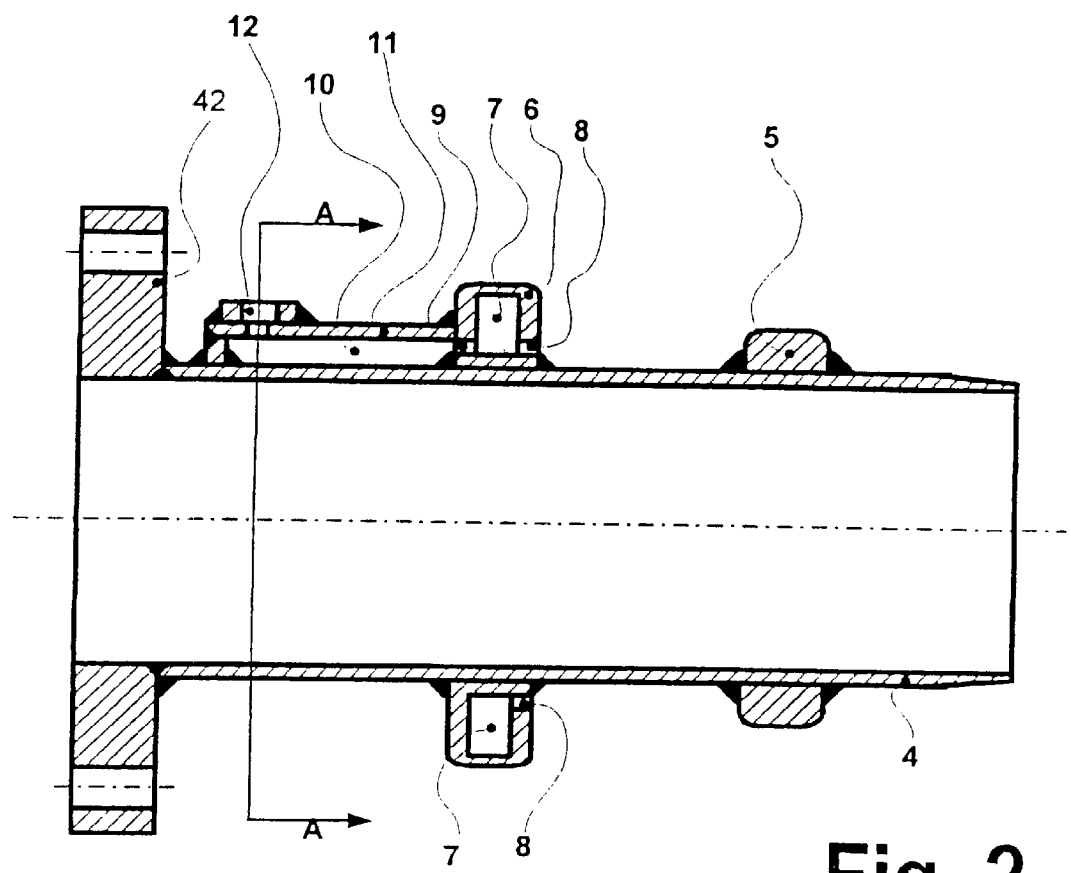
FIG. 2 shows an axial section through the connector with details of the zone of the fitting.
Figure 3:
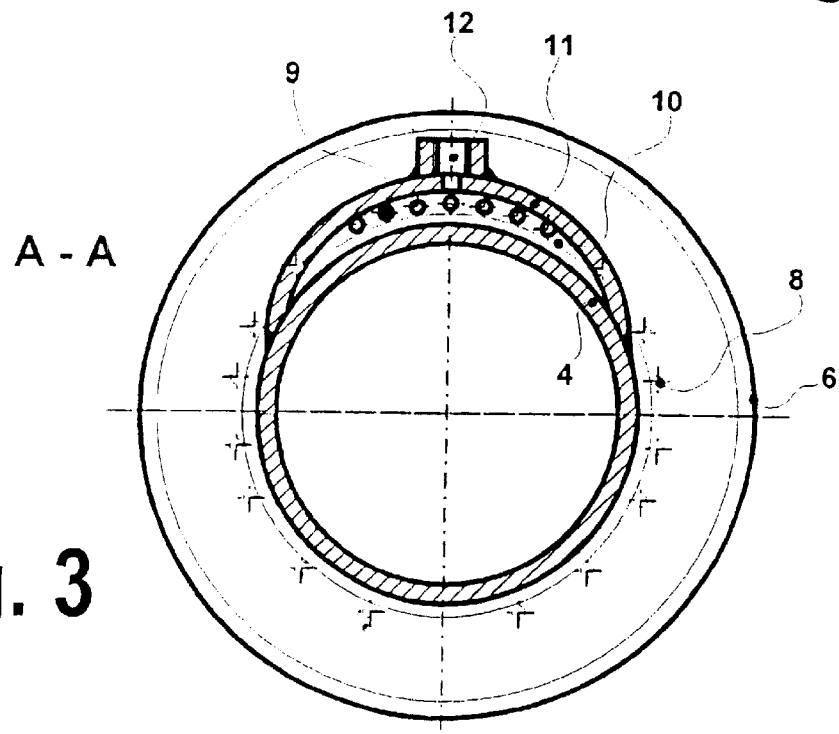
FIG. 3 shows a radial section through the connector according to FIG. 2 (section A—A).

The connector according to FIGS. 1 to 3 has the annular beads 5 and 6. The annular bead 6 is in this connection provided with a ring-shaped cavity 7. In the annular bead 6, the drilled holes 8 are radially provided at uniform intervals in the axial direction on the side of the tube. On the side of the flange, the drilled holes 9 are only partly distributed over the circumference in the axial direction.

A gap-shaped cavity 10 is present between the flange 42 and the bead 6. Said cavity covers about one third part of the circumference of the connector. A drilled hole 12 with a thread is provided in the chamber enclosure 11. Now, the two signal transmitters as defined by the invention are connected to said drilled hole.

A material with rough pores is arranged in the form of a ring within the intermediate cavity 43 between the inner tube 1 and the outer tube 2. Said material with rough pores may be located also in the in the annular gap 3 between the two tubes 1 and 2.

Figure 4:
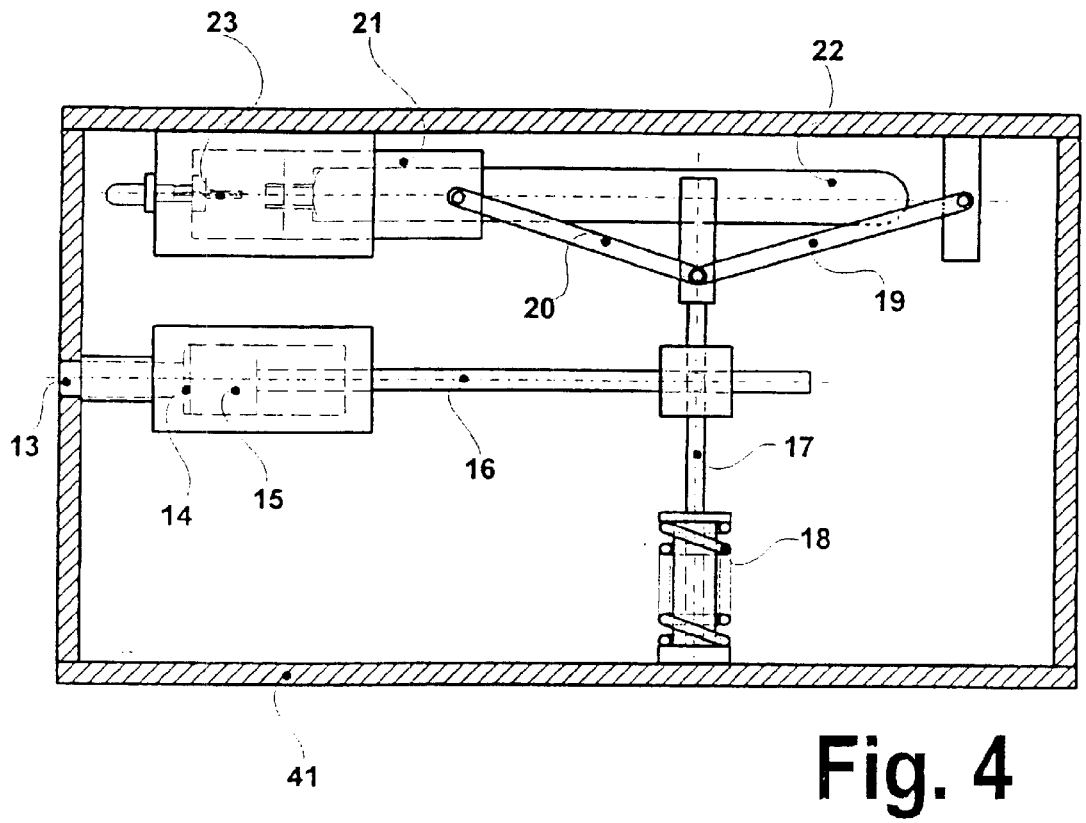
FIGS. 4 and 5 show the mode of operation of the first signal transmitter.
Figure 5:
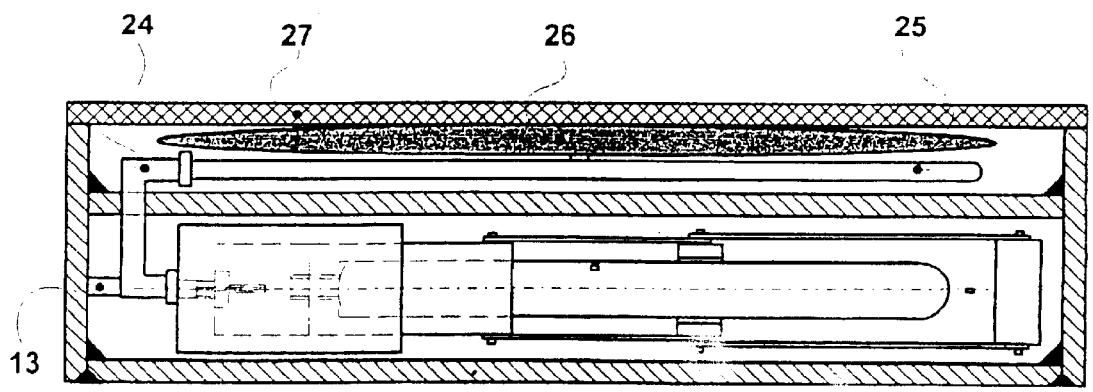

The first signal transmitter 41 according to FIG. 4 is connected to the drilled hole 12 via the connector opening 13. When the medium according to FIG. 1 enters the annular gap 3, it will flow via the roughly pored material located in the area of the intermediate cavity 43, and through the drilled holes 8 into the cavity 7, and from there through the drilled hole 9 and into the chamber 10. Through the drilled hole 12 and the connector opening 13, the medium flows into a cylinder 14, where a piston 15 is displaced to the front by the pressure building up in said cylinder. The piston rod 16 releases the bar 17. The spring 18 presses the angled bars 19 and 20 into a straight-lined shape, whereby a piston 21 is pushed to the front. A gas cartridge 22 is loaded in said piston 2. Said gas cartridge is pushed on a pin 43, which causes the gas cartridge to be opened. According to FIG. 5, the gas flows through a drilled hole in the pin 23 and into a pipeline 24. From there, the gas is then passed into a flexible tube 25. By way of the tube 25, the gas is then received in an inflatable container 26. Owing to the fact that said container 26 increases its volume and exerts pressure on the lid 27 of the container, said lid is knocked off. The container 26 is now capable of expanding. A valve is installed in the container 26, so that the gas cannot escape again from the container.

As soon as the container 26 is visible, the user is able to recognize that the inner tube 1 is defective (FIG. 8).

Figure 6:
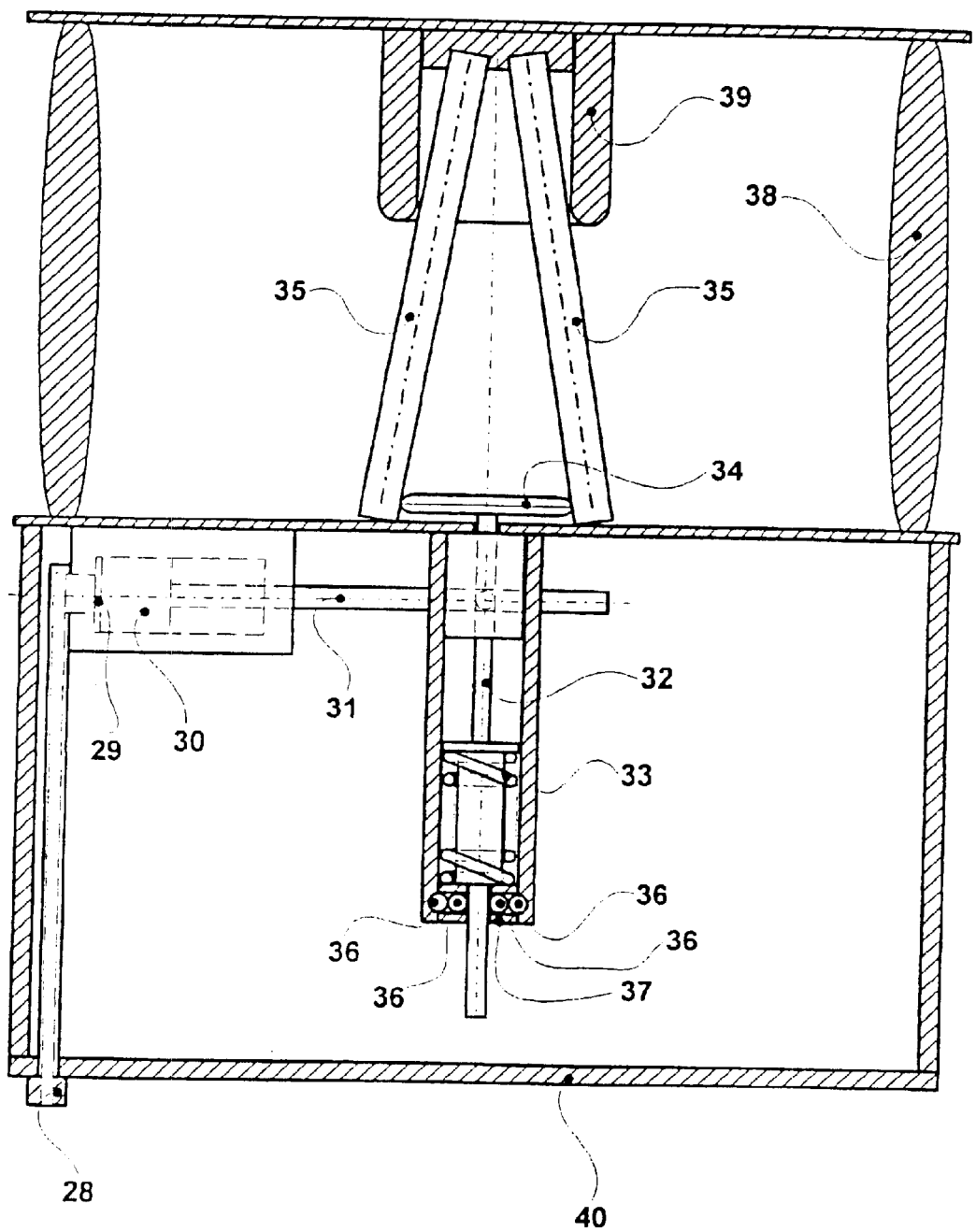
FIG. 6 shows the mode of operation of the second signal transmitter.

The problem is that such visual signs can be easily noticed in daylight, but fail under darkness. A second signal transmitter 40 was developed for that reason, which functions as follows:

According to FIG. 6, the medium exiting from the drilled hole 12 enters the opening 28. In the present embodiment, too, the medium is passed into a cylinder 29. The medium pushes the piston 30 and the piston 31 to the front. This action unlocks a bar 32 and the latter is pushed up by the spring 33 by means of a dish 34 secured on the end of said bar, which causes the attached light sticks 35 to buckle. Once the dish 34 has reached its uppermost top position, the bar 32 has been driven up to such an extent that the balls 36 drop out of the drilled hole of the disk 37, through which hole the piston rod 32 has passed. The disk 37 is forced out downwards by the spring. This permits the dish 34 with the bar 32 to be lowered again downwards, and the light sticks assume again their original position.

The buckling action of the light sticks 35 and their restraightening causes two chemicals in the light sticks to get mixed, so that the light sticks start to emit a light. Said light sticks are surrounded by the transparent material 38 and 39, so that the light is visible at night.

The two signal transmitters 40 and 41 as defined by the invention permit the operating personnel to monitor the system day and night. The system offers the advantage that it can operate independently of any energy sources.

What is claimed is:

1. A tube arrangement comprised of at least the following components, notably a flexible double wall tube comprising an inner tube (1) and an outer tube (2) forming an annular gap (3) that opens out into a widened cavity (43) in the vicinity of the tube ends;

a connector (4) arranged on each end of the double casing tube, whereby the connector is comprised of a flange (42) and a fitting, whereby the fitting in turn comprises a first annular bead (6) located in the end zone of the outer tube (2) and the intermediate cavity (43), as well as in most cases a second annular bead (5), which is located in the end zone of the inner tube (1) and, furthermore, provided with a gap-shaped chamber (10), the latter being located between the flange (42) and the first annular bead (6) and surrounded by a chamber enclosure (11); and whereby, furthermore, the chamber (10) is connected with the intermediate cavity (43) and a drilled hole (12) is provided in the chamber enclosure (11); as well as a signal transmitter (40, 41) mounted on each tube end in the zone of the fitting and each signal transmitter is connected with the drilled hole (12) of the chamber enclosure (11) by means of a connector opening (13, 28);

characterized in that the first signal transmitter (41) is an inflatable container (26) and the second signal transmitter (40) is a lamp with light sticks (35).

2. The tube arrangement according to claim 1, characterized in that the inflatable container (26) is inflatable by means of a cylinder comprised of a system comprising pistons (15, 21), bars (16, 17, 19, 20), and, furthermore, a spring (18) as well as a gas cartridge (22).

3. The tube arrangement according to claim 1, characterized in that the lamp is operated with light sticks (35), in which chemicals are mixed and caused to emit light.

4. The tube arrangement according to claim 1, characterized in that a coarsely pored material is provided behind the first annular bead (6) within the intermediate cavity (43).

5. The tube arrangement according to claim 1, characterized in that the annular gap (3) is provided with a coarsely pored material.

6. The tube arrangement according to claim 1, characterized in that the inner side of the outer tube (2) is lined with a plastic foil whereby said foil is preferably made of polyamide, polyethylene or fluorine plastics.

7. The tube arrangement according to claim 1, characterized in that the first annular bead (6) is provided with a ring-shaped cavity (7), the latter being connected with the annular gap (10) and the intermediate cavity (43) by means of drilled holes (8, 9).

8. The tube arrangement according to claim 1, characterized in that the chamber (10) surrounded by the chamber enclosure (11) is only partially present over the circumference of the fitting, particularly only on about one third part of the circumference of the connector.

9. The tube arrangement according to claim 7, characterized in that the first annular bead (6) with the ring-shaped cavity (7) has drilled holes (8) on the side of the tube, said drilled holes extending radially in the axial direction in a uniformly spaced manner, whereas drilled holes (9 present on the side of the flange open out in the axial direction, feeding into the partially arranged chamber (10).

10. The tube arrangement according to claim 1, characterized in that a valve is installed in the inflatable container (26).

11. The tube arrangement according to claim 1, characterized in that the inflatable container (26) is coated with a reflecting material.

12. The tube arrangement according to claim 1, characterized in that the light sticks (35) are surrounded by a transparent material (38, 39).

* * * * *